Nov. 7, 1933.  E. SCHIMANEK  1,934,238
METHOD OF OPERATING INTERNAL COMBUSTION ENGINES
Filed May 28, 1927  3 Sheets-Sheet 1

INVENTOR
Emil Schimanek
By Charles H. Hills Attys.

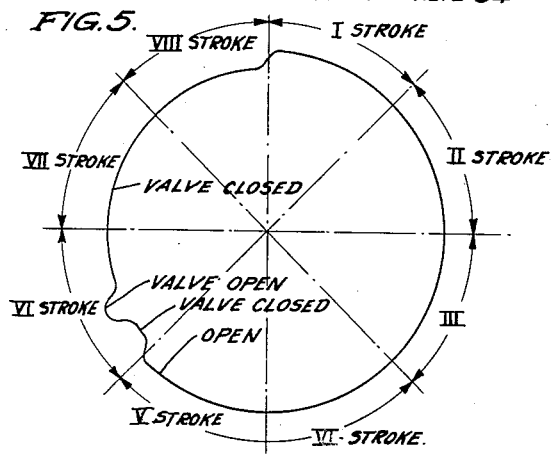
FIG. 5. — SUCTION AND TRANSFER VALVE 34
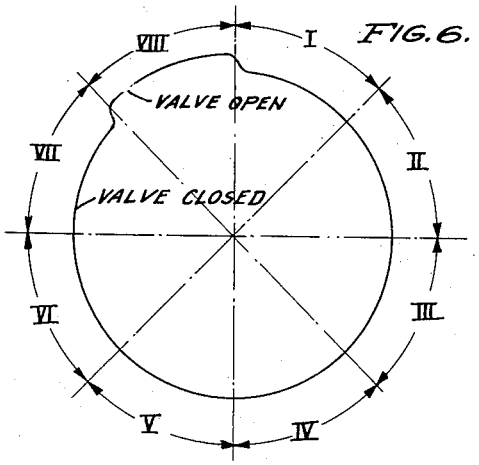
FIG. 6. — EXHAUST VALVE 35
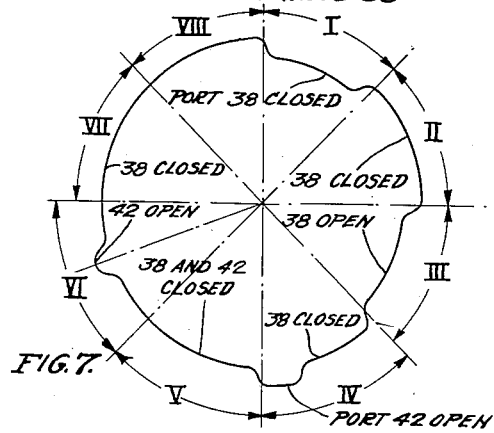
FIG. 7. — PISTON VALVE 39
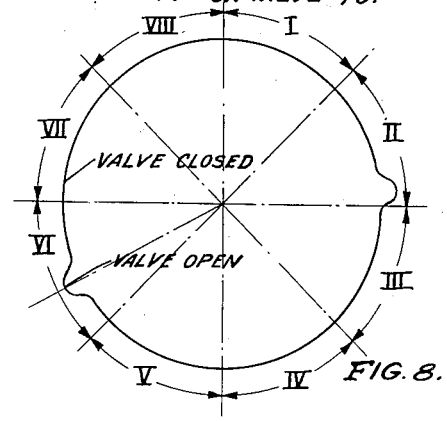
FIG. 8. — PISTON VALVE 40
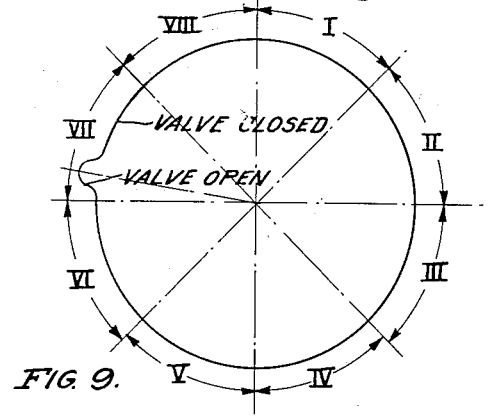
FIG. 9. — PISTON VALVE 36
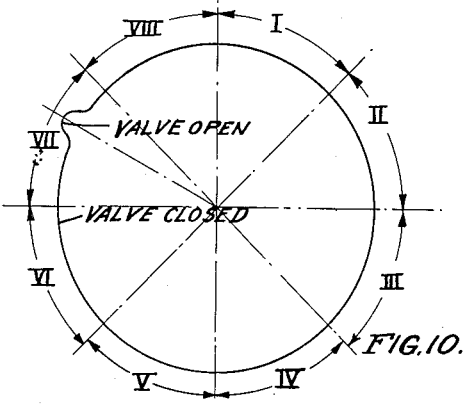
FIG. 10. — VALVE 37

Patented Nov. 7, 1933

1,934,238

UNITED STATES PATENT OFFICE 1,934,238

METHOD OF OPERATING INTERNAL COMBUSTION ENGINES

Emil Schimanek, Budapest, Hungary

Application May 28, 1927, Serial No. 194,919, and in Austria October 19, 1926

7 Claims. (Cl. 123—1)

This invention relates to internal combustion engines, and more particularly to the method of working internal combustion engines operating on more than a four-stroke cycle.

In the working of the novel method of this invention the maximum possible weight of cold air is pumped by the engine during the compressing portion of the operating cycle, for use in the power stroke, the stored air is housed by a heat exchanger utilizing the exhaust gases of the engine; and the stored air is selectively introduced into the working cylinder during the compression stroke immediately preceding the power stroke at the proper temperature and pressure to attain maximum thermal efficiency. The hot gases are selectively bled to a heat exchanger during the power stroke, and they are exhausted through a heat exchanger on the last stroke of the operating cycle. Air is pumped in a state permitting maximum fluid capacity of the pump, it is heated in stages, the conditioned air is selectively returned to the working cylinder at the proper time, and the working fluid is selectively bled to a heat exchanger during the power stroke with due regard to the temperatures of the heating and heated mediums.

Reference is made to the accompanying drawings which illustrate by way of example several typical embodiments of apparatus suitable for carrying out the method according to the invention and in which:

Figs. 5 to 10 illustrate diagrammatically the operating sequence of the valves shown in Figure 1.

Fig. 1 illustrates, by way of example, an eight-stroke-cycle engine run in accordance with the present method.

Figure 1:
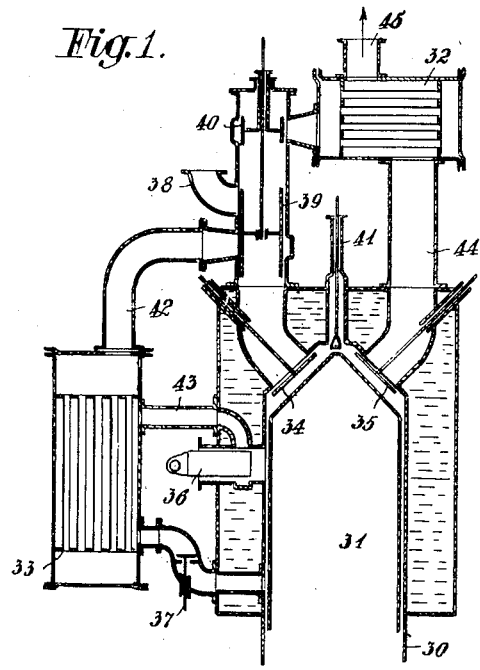
Fig. 1 represents an embodiment in which the precompressed air is produced in the working cylinder and is transferred into one of two heat-exchange apparatus, alternately, at each compression stroke.

This diagrammatically represented eight-stroke-cycle engine consists of a working cylinder 30, with piston 31, and also of two heat-exchange apparatus 32 and 33. The valve 34 is the suction and transfer valve, and valve 35 is the exhaust valve of the cylinder. A control piston 36 serves to regulate the transference of the gases of combustion, after the first expansion stage, from the cylinder 31 into the heat-exchange apparatus 33. A valve 37 regulates the return of the products of combustion—which have been partially cooled in the heat-exchange apparatus 33—to the cylinder 30 for further expansion. A piston valve 39 serves to regulate the admission of air through the branch 38 into the cylinder, and to regulate the flow, both of the air out of the cylinder into the heat-exchange apparatus 33 and the return flow from the apparatus 33 into the cylinder 30.

Another piston valve 40 is provided for regulating both the transfer of the air from the cylinder into the heat-exchange apparatus 32 and also the return flow from this apparatus into the cylinder 30.

The fuel is injected into the cylinder 31 through the fuel valve 41, which valve is operated by cam means (not shown).

Referring to Figures 1 and 5 to 10, the engine operates in the following manner:

During the first (down) stroke of the piston, air is drawn into the cylinder 30 through the intake 38 and valve 34. During the succeeding second (up stroke), the indrawn air is, in the open position of the slide 40, passed through the still open valve 34 and branch 39 into the heat-exchange apparatus 32. During the third (down) stroke of the piston, air is again drawn into the cylinder 30 through the intake 38 and valve 34, which air is passed, during the succeeding fourth (up) stroke—in the open position of the piston valve 39—through the branch 42 into the heat-exchange apparatus 33. Communication is thus established with the heat-exchange apparatus 32 and 33 alternately, during the establishment of which, the suction intake 38 is closed towards the suction valve 34. The succeeding fifth (down) stroke is again a suction stroke. Air flows through the intake 38 and valve 34 into the cylinder 30. During the succeeding sixth (up) stroke, several changes of condition take place. In the first place, the valve 34 being closed, the air last drawn in is compressed in the cylinder 30, then the valve 34 is opened, and at the same time the slide 40 is so displaced that the air forced into and warmed in the heat-exchange apparatus 32 during the second stroke, can flow back into the cylinder 30. After the valve 40 has closed, a further compression takes place in the cylinder. The valve 39 then establishes communication between the heat-exchange apparatus 33 and the cylinder 30 and allows the air forced into and heated in the heat-exchange apparatus 33 during the fourth stroke, to flow back into the cylinder 30.

The suction valve 34 now closes, and the air is compressed in the cylinder during the remaining portion of the stroke.

During the succeeding seventh (down) stroke the combustion of fuel injected through the valve 41 takes place, followed by the expansion. During this expansion, the control piston 36 establishes connection, through the pipe 43, between the cylinder 30 and the heat-exchange apparatus 33, in order to allow a portion of the products of combustion to pass from the cylinder into the heat-exchange apparatus. These combustion products are however returned through the heat-exchange apparatus 33 and valve 37, to the cylinder 30, in order to take part in the remaining portion of the expansion.

In the last, eighth (up) stroke, the now completely expanded products of combustion are expelled into the heat-exchange apparatus 32, through the valve 35 and branch 44, and thence through the exhaust 45 into the open air.

Figure 2:
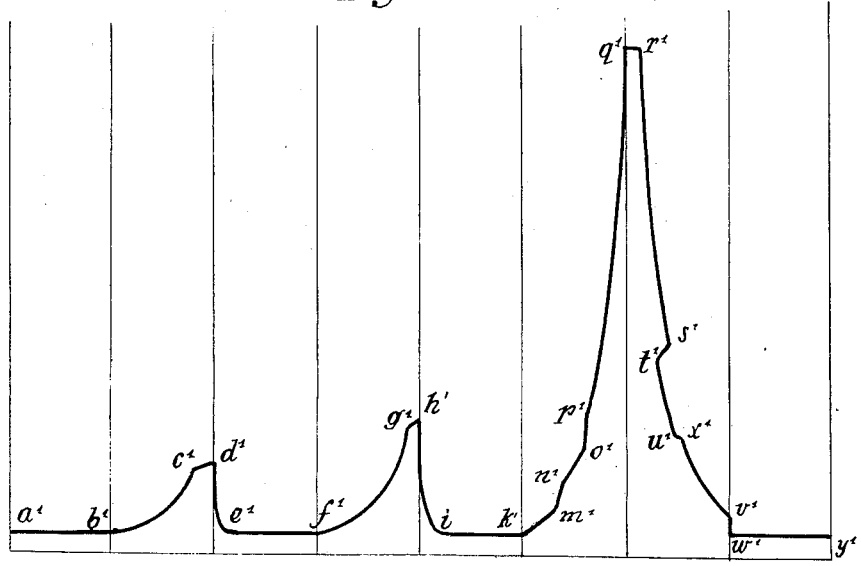
Fig. 2 is the diagram corresponding to Fig. 1.

The changes of condition occurring during a working operation are represented diagrammatically in Fig. 2. In this figure the abscissæ indicate the volume and the ordinates the pressure. The eight strokes are represented in successive order.

The first suction stroke is represented by the line $a'-b'$. The line $b'-c'-d'$ corresponds to the compression and the transference of the air into the heat-exchange apparatus 32. The line $e'-f'$ represents the second suction stroke. The line $f'-g'-h'$ represents the compression and passage of the air, drawn in during the preceding stroke, into the heat-exchange apparatus 33.

The line $i'-k'$ represents the third suction stroke. The line of the next stroke consists of several portions, namely five. $k'-m'$ indicates the compression of the air last drawn in; $m'-n'$, the return flow of the air out of the heat-exchange apparatus 32 into the cylinder. The line $n'-o'$ represents the compression in the cylinder. $o'-p'$ is the return flow of the air from the heat-exchange apparatus 33 to the cylinder; and finally $p'-q'$ represents the remaining course of the compression; $q'-r'$ represents the combustion line; $r'-s'$, the line of expansion of the products of combustion up to the time when the control piston 36 (Fig. 1) opens. $s'-t'$ represents the flow of a portion of the products of combustion from the cylinder into the heat-exchange apparatus 33. $t'-u'$ represents the expansion of the products of combustion remaining in the cylinder; $u'-x'$ the return flow into the cylinder of the products of combustion previously drawn from the cylinder for passage through the heat-exchange apparatus device 33; and finally, $x'-v'$, the remaining portion of the expansion, $v'-w'-y'$ represents the exhaust by way of the heat-exchange apparatus 32.

Figure 3:
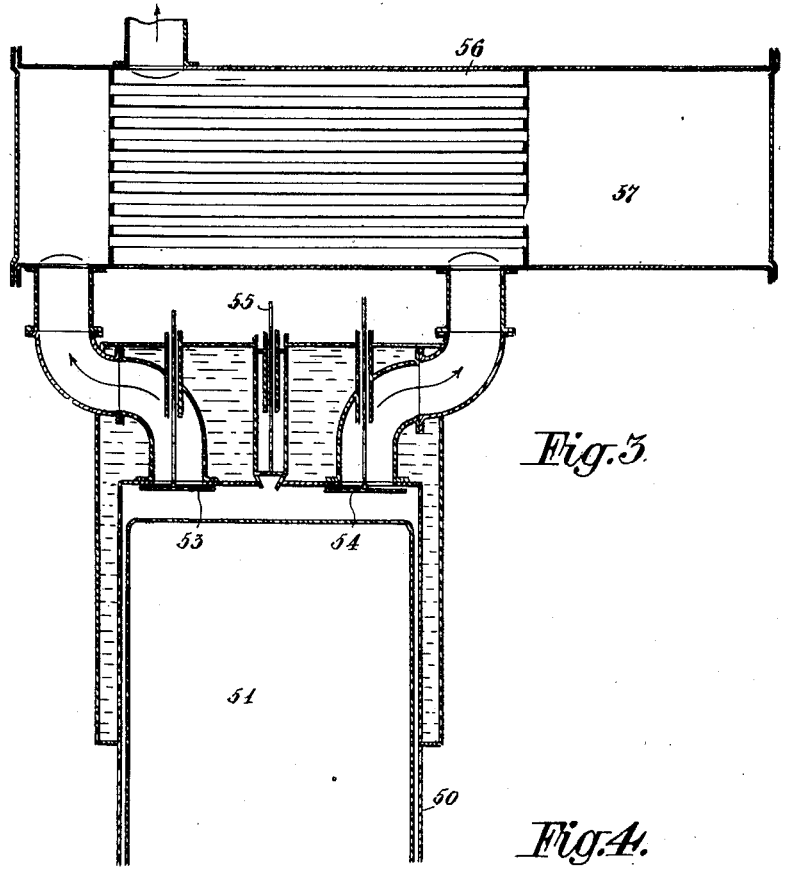
Fig. 3 is another embodiment in which only one heat-exchange apparatus is provided.

The transfer of heat from the products of combustion to the compressed air may also be effected by means of a single heat-exchange apparatus, in place of two or more. An engine working with a single heat-exchange apparatus is shown in Fig. 3.

In this figure, 50 indicates the cylinder, 51 the piston, 53 the transfer valve, 54 the exhaust valve, 55 the fuel valve and 56 the single heat-exchange apparatus. The suction valve is not shown in the figure.

This embodiment operates in the following manner:

First stroke.—Piston descends and draws air from the atmosphere, through the suction valve (not shown) into the cylinder. Second stroke.— Piston ascends, and the air is forced through the valve 53 into the heat-exchange apparatus 56. Third stroke.—Piston descends and again draws air from the atmosphere through the suction valve (not shown) into the cylinder. Fourth stroke.—Piston ascends, thereby forcing the previously indrawn air through the valve 53 into the heat-exchange apparatus 56. Fifth stroke.— Piston descends and draws air in from the atmosphere for a third time. Sixth stroke.—This stroke consists of three sections. At the beginning of the stroke the air last drawn in is compressed. The valve 53 between the cylinder and the heat-exchange apparatus then opens, to allow the return to the cylinder of the air forced into the heat-exchange apparatus during the second and fourth strokes, and warmed therein during the interval. The third section of the stroke effects the remaining compression. Seventh stroke.—Combustion of the fuel injected through the valve 55 and expansion of the products of combustion up to the end of the stroke. Eighth stroke.—Exhaust through the valve 54 into the open air by way of the heat-exchange apparatus 56.

This heat-exchange apparatus is fitted with an air-circulation chamber 57, ensuring circulation of the air passed through the heat-exchange apparatus, which air, in the absence of such a chamber, would stagnate in the apparatus.

Figure 4:
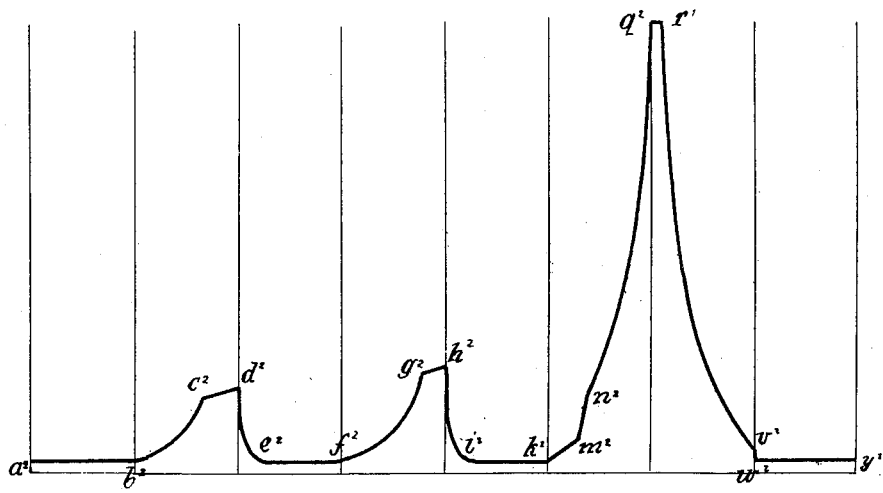
Fig. 4 is the diagram corresponding to Fig. 3.

The changes of condition during this working operation are represented in Fig. 4; the abscissæ correspond to the volumes and the ordinates to the pressures. The strokes are illustrated in succession. The line $a2-b2$ shows the first suction stroke. The line $b2-c2-d2$ shows the compression and flow of air from the cylinder into the heat-exchange apparatus. The line $e2-f2$ corresponds to the second suction stroke. The line $f2-g2-h2$ shows the compression and passage of the second portion of indrawn air into the heat-exchange apparatus. The line $i2-k2$ represents the third suction stroke, and the line $k2-m2$ the compression of the air thus drawn in for the third time. The line $m2-n2$ denotes the return flow into the cylinder of the air drawn in during the first and second suction strokes; and the line $n2-q2$ the remaining compression. The line $q2-r2$ denotes the combustion, the line $r2-v2$, the expansion of the products of combustion; and finally, the line $v2-w2-y2$ the exhaust through the heat-exchange apparatus into the outer air.

In the hereinbefore described method of operation, it is advisable to cool the working cylinder or cylinders, since such cooling enables the compression to proceed in an approximately isothermal manner. Such a course of the compression has in this case, the advantage that the combustion air is enabled to absorb a greater amount of heat from the gases of combustion in the heat-exchange apparatus than with an adiabatic course of compression. Hence, whereas the cooling of the working cylinder is a drawback in the known internal combustion engines, on account of the removal of heat, cooling is advantageous when working according to the invention.

What I claim is:

1. A method of operating internal combustion engines supplied with compressed air heated by the exhaust gases of the engine, characterized in that the working cylinder is charged with the compressed and heated air, at one or more intermediate stages of the piston stroke preceding the power stroke, said air having been heated by the exhaust gases while occupying a smaller volume than corresponds to that to which it expands in the working cylinder at the end of the power stroke, and at a pressure lower than its final compression in the working cylinder preceding the combustion.

2. Method of operation as set forth in claim 1, in which the heat exchange with the precompressed combustion air is effected by means of the exhaust gases which are drawn off from the working cylinder at suitable stages of the expansion.

3. Method of operation as set forth in claim 1, in which the precompression of the combustion air and the expansion of the exhaust gases take place in several stages, these two operations (accompanied by an exchange of heat between the air and the exhaust gases) being combined in such a manner that precompressed air drawn from a higher compression stage is always heated by exhaust gases which are taken from a higher expansion stage and are therefore less expanded and hotter.

4. Method of operation as set forth in claim 1, in which only a portion of the total combustion air is subjected to heat exchange, characterized by the feature that the introduction of the precompressed and heated partial portion of the combustion air into the working cylinder and into the combustion air present in said working cylinder, being effected during the compression stroke immediately preceding combustion, in one or more intermediate positions of the working piston prior to the end of its stroke, said air, and the air already present in the working cylinder, being subjected to a final compression in the said cylinder.

5. Method of operation as set forth in claim 1, in which the precompressed air is produced by causing the engine to operate first as a pump adapted to deliver the aspirated air into a preheater where it is heated by heat exchange with the exhaust gases.

6. Method of operation as set forth in claim 1, which is carried out in an internal-combustion engine operating on a system exceeding four strokes per cycle and in which each suction stroke draws in combustion air from the atmosphere, whilst the whole or part of the combustion air already precompressed in the working cylinder by the compression stroke or strokes preceding the final compression stroke is heated outside the working cylinder, in a precompressed state, by exhaust gases, the resulting heated precompressed air being returned during the last compression stroke into the working cylinder and into the combustion air entering said working cylinder during the final suction stroke, at one or more moments at which part of the final compression stroke has already taken place.

7. Method of operation as set forth in claim 1, in which the amounts of combustion air precompressed in the compression strokes preceding the final compression stroke, are subjected to heat exchange either separately or conjointly.

EMIL SCHIMANEK.